US012584456B2

(12) United States Patent
Yang et al.

(10) Patent No.:  US 12,584,456 B2
(45) Date of Patent:      Mar. 24, 2026

(54) METHOD AND APPARATUS FOR IDENTIFYING S-CHARACTERISTIC OF PUMP TURBINE, AND CONTROL METHOD

(71) Applicant: CSG POWER GENERATION CO., LTD. MAINT. & TEST CO., Guangzhou (CN)

(72) Inventors: Mingxuan Yang, Guangzhou (CN); Yaxiong Yu, Guangzhou (CN); Yu Gong, Guangzhou (CN); Xiaobo Qiu, Guangzhou (CN); Tao Chen, Guangzhou (CN); Qing Li, Guangzhou (CN); Hao Wu, Guangzhou (CN); Kaiwei Xu, Guangzhou (CN)

(73) Assignee: CSG POWER GENERATION CO., LTD. MAINT. & TEST CO., Guangzhou (CN)

( * ) Notice: Subject to any disclaimer, the term of this patent is extended or adjusted under 35 U.S.C. 154(b) by 48 days.

(21) Appl. No.: 18/704,310

(22) PCT Filed: Oct. 31, 2023

(86) PCT No.: PCT/CN2023/128670
§ 371 (c)(1),
(2) Date: Apr. 24, 2024

(87) PCT Pub. No.: WO2024/239548
PCT Pub. Date: Nov. 28, 2024

(65) Prior Publication Data
US 2025/0109731 A1      Apr. 3, 2025

(30) Foreign Application Priority Data

May 22, 2023    (CN) ......................... 202310577354.1

(51) Int. Cl.
*F03B 15/00* (2006.01)
*F03B 11/00* (2006.01)
(Continued)

(52) U.S. Cl.
CPC ............ *F03B 15/00* (2013.01); *F03B 11/008* (2013.01); *F04D 27/001* (2013.01); *G01M 15/00* (2013.01)

(58) Field of Classification Search
CPC ...... F03B 15/00; F03B 11/008; F04D 27/001; G01M 15/00
See application file for complete search history.

(56) References Cited

U.S. PATENT DOCUMENTS 4,253,794 A      3/1981  Kuwabara
4,354,800 A  *  10/1982  Kuwabara ............... F03B 15/12
                                                              415/36
(Continued)

FOREIGN PATENT DOCUMENTS

CN          1193691 A      9/1998
CN          1497172 A      5/2004
(Continued)

OTHER PUBLICATIONS

International Search Report for corresponding PCT Application No. PCT/CN2023/128670, dated Feb. 9, 2024, 3 pages.
(Continued)

*Primary Examiner* — Andrew J Marien
(74) *Attorney, Agent, or Firm* — Taft, Stettinius & Hollister LLP

(57)               ABSTRACT
The present disclosure discloses a method and an apparatus for identifying an S-characteristic of a pump turbine and a control method. The method for identifying an S-characteristic of a pump turbine includes: collecting a set of state parameters of the pump turbine at a preset time interval,
(Continued)

wherein the state parameters comprise a flow rate and a rotation speed of the pump turbine; calculating a slope of a relationship curve between the rotation speed and the flow rate of the pump turbine within a current preset time interval; and determining, according to the positivity or negativity and an absolute value of the slope, whether the pump turbine enters an S-characteristic region.

7 Claims, 4 Drawing Sheets

(51) Int. Cl.
*F04D 27/00* (2006.01)
*G01M 15/00* (2006.01)

(56) References Cited

U.S. PATENT DOCUMENTS 4,382,745 A      5/1983  Kuwabara et al.
4,475,865 A  *  10/1984  Sugishita ................ F03B 15/04
                                                              415/36

2005/0267644 A1*  12/2005  Kuwabara ............. F03B 15/005
                                                              700/287
2017/0268478 A1*  9/2017  Alloin ....................... F03B 3/06

FOREIGN PATENT DOCUMENTS

| CN | 115081138 | A |  | 9/2022 |  |  |
|----|-----------|---|---|--------|---|---|
| CN | 115450821 | A |  | 12/2022 |  |  |
| CN | 115879388 | A |  | 3/2023 |  |  |
| CN | 116292034 | A |  | 6/2023 |  |  |
| CN | 117057281 |  | * | 8/2023 | ............. | G06F 30/17 |
| CN | 117933111 |  | * | 8/2023 | ............. | G06F 30/28 |
| CN | 118194477 |  | * | 5/2024 | ............. | G06F 30/17 |

OTHER PUBLICATIONS

Written Opinion for corresponding PCT Application No. PCT/CN2023/128670, dated Feb. 9, 2024, 4 pages.
Chinese Patent Office, Search Report issued in corresponding Application No. 2023105773541, dated Jun. 14, 2023, 2 pp.

* cited by examiner

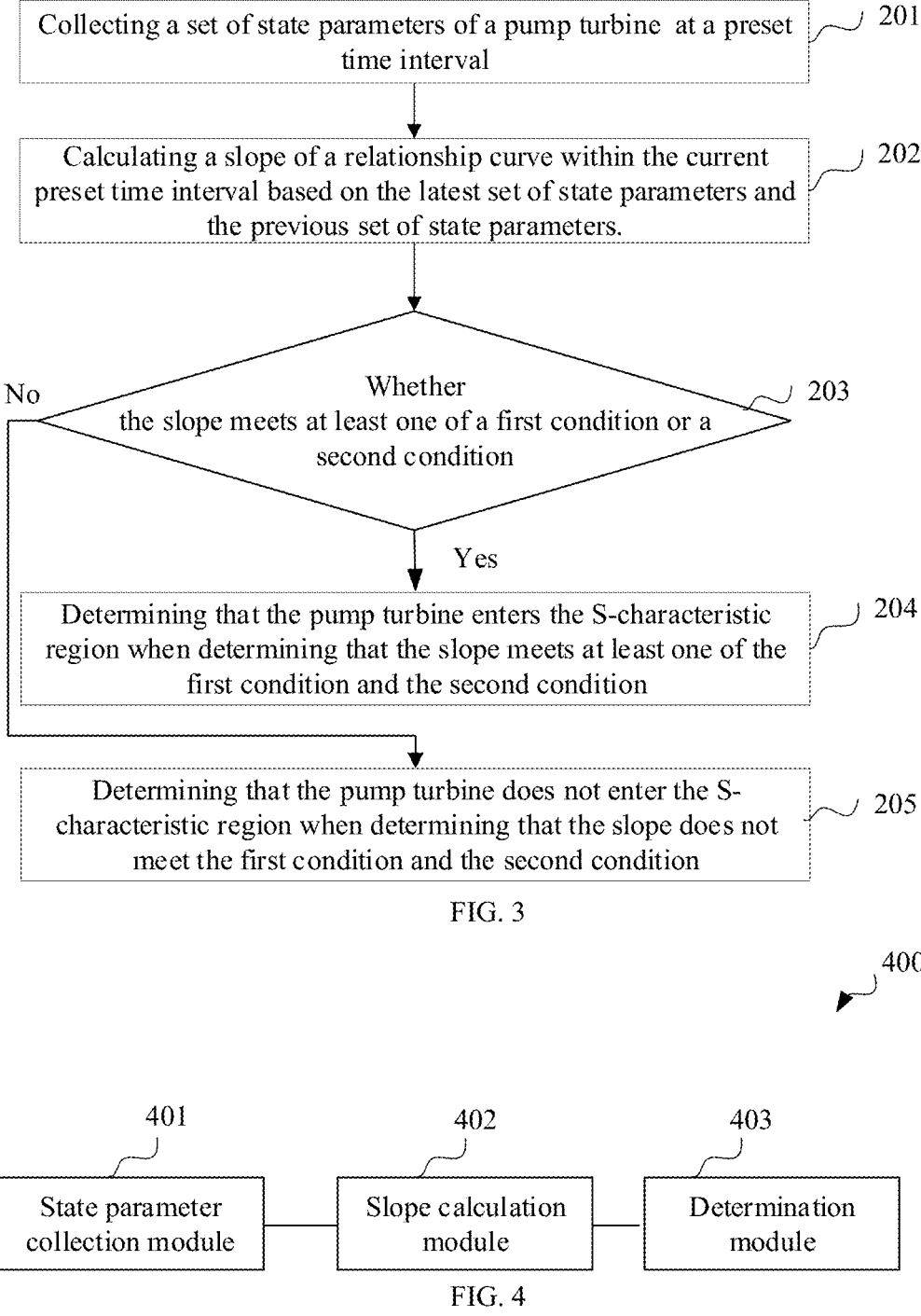

Collecting a set of state parameters of a pump turbine at a preset time interval  201

Calculating a slope of a relationship curve within the current preset time interval based on the latest set of state parameters and the previous set of state parameters.  202

Whether the slope meets at least one of a first condition or a second condition  203

No

Yes

Determining that the pump turbine enters the S-characteristic region when determining that the slope meets at least one of the first condition and the second condition  204

Determining that the pump turbine does not enter the S-characteristic region when determining that the slope does not meet the first condition and the second condition  205

| 401 | 402 | 403 |
|---|---|---|
| State parameter collection module | Slope calculation module | Determination module |

FIG. 4

METHOD AND APPARATUS FOR IDENTIFYING S-CHARACTERISTIC OF PUMP TURBINE, AND CONTROL METHOD

CROSS-REFERENCE TO RELATED APPLICATIONS

The present application is a national stage application of PCT international application No. PCT/CN2023/128670 filed on Oct. 31, 2023, which claims priority to Chinese patent application No. 2023105773541, filed on May 22, 2023, the entire contents of which are incorporated herein by reference.

TECHNICAL FIELD

The present disclosure relates to the field of pump turbine control technologies, and particularly to a method and an apparatus for identifying an S-characteristic of a pump turbine, and a control method.

BACKGROUND

A pumped storage power station is a large-scale storage system that can work as a pump and a turbine. It has dual attributes of a power plant and a consumer, and can regulate the power system.

During the speed regulation of a pump turbine, the operating state of the turbine may enter the S-characteristic region. When the operating state of the pump turbine enters the S-characteristic region, it is unable to directly carry the load in a no-load state, and after de-load, the turbine is unstable during the no-load operation. Therefore, the identification and early warning of the S-characteristic have gradually attracted attention.

SUMMARY

According to a first aspect, an embodiment of the present disclosure provides a method for identifying an S-characteristic of a pump turbine. The method includes:

collecting a set of state parameters of the pump turbine at a preset time interval, the state parameters including a flow rate and a rotation speed of the pump turbine;

calculating a slope of a relationship curve between the rotation speed and the flow rate of the pump turbine within a current preset time interval; and determining, according to the positivity or negativity and the absolute value of the slope, whether the pump turbine enters an S-characteristic region.

In some embodiments, calculating the slope of the relationship curve between the rotation speed and the flow rate of the pump turbine within the current preset time interval includes:

calculating the slope of the relationship curve within the current preset time interval according to a latest set of state parameters and a previous set of state parameters.

Determining, according to the positivity or negativity and the absolute value of the slope, whether the pump turbine enters the S-characteristic region includes:

determining whether the slope meets at least one of a first condition or a second condition, the first condition being that the slope is positive, and the second condition being that the absolute value of the slope is greater than a first preset value;

determining that the pump turbine enters the S-characteristic region when the slope meets at least one of the first condition or the second condition; and determining that the pump turbine does not enter the S-characteristic region when the slope does not meet the first condition and the second condition.

The first preset value is equal to a product of a preset coefficient and a historical slope, and the historical slope is a slope of the relationship curve within a previous preset time interval.

In some embodiments, the preset coefficient is equal to a historical minimum slope ratio of the pump turbine, and the slope ratio is equal to a ratio of a slope of the relationship curve within the first preset time interval after the pump turbine enters the S-characteristic region to a slope of the relationship curve within the last preset time interval before the pump turbine enters the S-characteristic region.

In some embodiments, the preset coefficient is determined based on an identification accuracy requirement.

In some embodiments, the relationship curve between the rotation speed and the flow rate of the pump turbine is obtained by fitting multiple sets of state parameters.

In some embodiments, calculating the slope of the relationship curve between the rotation speed and the flow rate of the pump turbine within the current preset time interval includes: calculating the slope of the relationship curve within the current preset time interval according to fitted data of the relationship curve in the preset time interval.

According to a second aspect, an embodiment of the present disclosure further provides apparatus for identifying an S-characteristic of a pump turbine, including a state parameter collection module, a slope calculation module, and a determination.

The state parameter collection module is configured to collect a set of state parameters of the pump turbine at a preset time interval, and the state parameters include a flow rate and a rotation speed of the pump turbine.

The slope calculation module is configured to calculate a slope of a relationship curve between the rotation speed and the flow rate of the pump turbine within a current preset time interval.

The determining module is configured to determine, according to the positivity or negativity and an absolute value of the slope, whether the pump turbine enters an S-characteristic region.

The determining module includes a slope determination unit, a first S-characteristic region determination unit, and a second S-characteristic region determination unit.

The slope determining unit is configured to determine whether the slope meets at least one of a first condition or a second condition. The first condition is that the slope is positive, and the second condition is that the absolute value of the slope is greater than a first preset value.

The first S-characteristic region determination unit is configured to: determine that the water pump turbine enters the S-characteristic region when the slope meets at least one of the first condition or the second condition.

The second S-characteristic region determination unit is configured to determine that the pump turbine does not enter the S-characteristic region when the slope does not meet the first condition and the second condition.

According to a third aspect, an embodiment of the present disclosure further provides a pump turbine control method. The pump turbine control method includes:

identifying whether a pump turbine enters an S-characteristic region using the method for identifying an S-characteristic of a pump turbine according to any one of the first aspect; and regulating a speed of the pump turbine according to an identification result and a power generation amount of the pump turbine.

In some embodiments, after identifying whether the pump turbine enters the S-characteristic region, the method further includes:

outputting an alert signal when the identification result indicates that the pump turbine enters the S-characteristic region.

BRIEF DESCRIPTION OF THE DRAWINGS

FIG. 3 is a schematic flowchart of another method for identifying an S-characteristic of a pump turbine according to an embodiment of the present disclosure.

FIG. 4 is a schematic diagram of a configuration of an apparatus for identifying an S-characteristic of a pump turbine according to an embodiment of the present disclosure.

DETAILED DESCRIPTION OF THE EMBODIMENTS

The present disclosure is described in detail below with reference to the accompanying drawings and embodiments. It should be understood that the specific embodiments described herein are only for the purpose of explaining the present disclosure and are not to limit the present disclosure. In addition, it should be noted that, for ease of description, only the portions related to the present disclosure are shown in the accompanying drawings, but not the entire structure.

The S-characteristic of the pump turbine is a key factor that constrains the safe and stable operation of the pump turbine. Referring to the Q-n curve of a pump turbine shown in FIG. 1, if the pump turbine has a serious S characteristic, i.e., the pump turbine operates in the S-characteristic region, the unit of the pump turbine is unable to directly carry the load in a no-load state, causing difficulties in the grid connection startup of the pump turbine. In addition, the pump turbine with obvious S-characteristics may experience unstable operation under no-load conditions after de-load, which seriously endangers the operation safety of the pump turbine.

At present, it is typical to identify whether a pump turbine has entered the S-characteristic region according to the positive or negative slope of the Q-n curve of the pump turbine. However, this identification method is unable to make a correct determination during the transition phase when the pump turbine is about to enter the S-characteristic region or has just entered the S-characteristic region, so the warning is often untimely. After a study by the inventor, it is found that data points on the Q-n curve are collected discretely. For two data points before and after a preset time period, one data point may be collected in the negative slope region while another data point may be collected in the positive slope region, which may result in the slope of the straight line connecting the two points being negative. As a result, the pump turbine is determined as not entering the S-characteristic region but has actually presented the S-characteristic. This false or delayed identification result may lead to untimely speed regulation, and further increases the probability of accidents occurring in the pump turbine.

Figure 2:
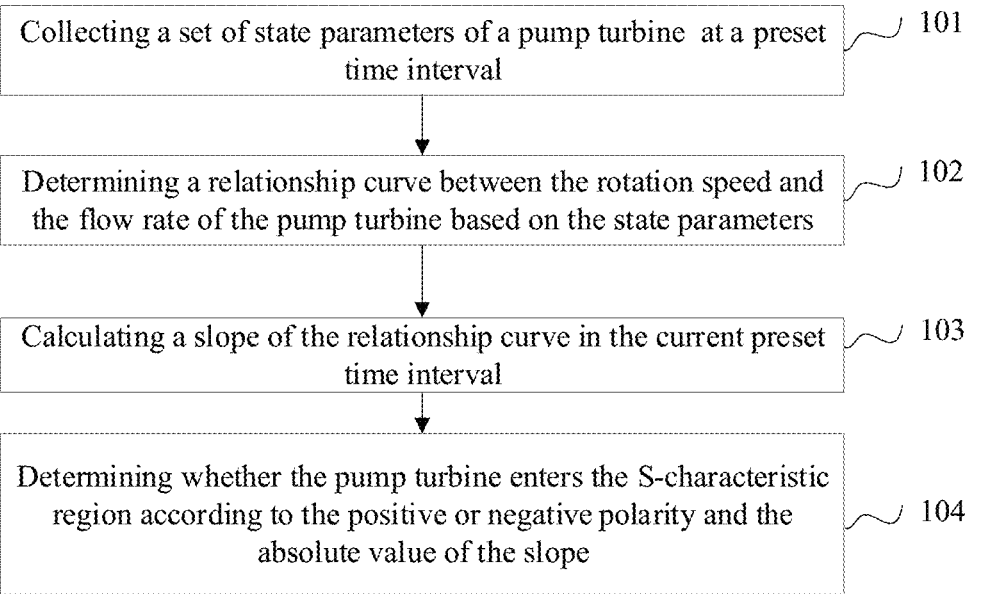
FIG. 2 is a schematic flowchart of a method for identifying an S-type characteristic of a pump turbine according to an embodiment of the present disclosure.

Based on this, an embodiment of the present disclosure provides a method for identifying an S-characteristic of a pump turbine. The method for identifying an S-characteristic is applied to a pumped storage power station and can be started according to a speed regulation instruction. FIG. 2 is a schematic flowchart of the method for identifying an S-characteristic of a pump turbine according to an embodiment of the present disclosure. Referring to FIG. 2, the method for identifying an S-characteristic of a pump turbine includes steps S101-S104.

In step S101, a set of state parameters of a pump turbine are collected at a preset time interval.

The state parameters include a flow rate and a rotation speed of the pump turbine. The preset time interval is a determined time interval set for the state parameter collection, and all of the preset time intervals are of equal duration.

Specifically, during the operation of the pump turbine, the rotation speed and flow rate of the pump turbine can be collected, respectively, using a rotation speed measurement device and a flow measurement device disposed at the pump turbine. The rotation speed and flow rate collected at the same time belong to the same set of state parameters. A set of state parameters of the pump turbines are collected at a preset time interval. The preset time interval may be set according to a rated power of the pump turbine and a speed regulation requirement of a user. For example, the preset time interval may be set to 1 minute.

Exemplarily, when a pumped storage power station receives a speed regulation instruction, it indicates that a speed regulation control needs to be performed on the pump turbine in the pumped storage power station. Thereafter, the generated power, rotation speed, and flow rate of the pump turbine are measured for several times within a preset speed regulation period, respectively using a power sensing assembly, a rotation speed measurement device, and a flow measurement device. The duration of the preset speed regulation period may be determined according to an average value of history speed regulation periods of the pump turbine. In the speed regulation period, a set of state parameters are collected at a preset time interval, and the speed regulation period may include multiple preset time intervals.

In step S102, a relationship curve between the rotation speed and the flow rate of the pump turbine is determined based on the state parameters.

Specifically, the relationship curve between the rotation speed and the flow rate of the pump turbine is determined based on multiple sets of collected state parameters. For example, the relationship curve between the rotation speed and the flow rate of the pump turbine may be obtained by fitting the multiple sets of state parameters. Alternatively, the relationship curve between the rotation speed and the flow rate of the pump turbine may be obtained by connecting the points of the multiple sets of state parameters. In this step, the relationship curve between the rotation speed and the flow rate of the pump turbine is determined, which can facilitate the person who regulates the speed to an judgment on whether the pump turbine enters the S-characteristic region according to experience. This step actually does not affect the implementation of the subsequent identification step, such that the step of determining the relationship curve between the rotational speed and the flow rate of the pump turbine may be omitted in some identification embodiments.

Exemplarily, state parameters are drawn successively to form parameter points. The rotation speed and the flow rate in the state parameter are taken as the horizontal and vertical coordinates of the relationship curve between the rotation speed and the flow rate of the pump turbine, respectively. According to the state parameters collected in step S101, points are drawn in sequence according to the collection sequence. Each set of collected state parameters of the pump turbine affords one parameter point.

Then, a relationship curve is determined by connecting the parameter points sequentially in the order in which the state parameters were collected. In accordance with the collection sequence of the corresponding state parameters, the respective parameter points are sequentially connected, and two adjacent points may be connected by a straight line. Therefore, the relationship curve between the rotation speed and the flow rate of the pump turbine is determined. An image of the relationship curve can be referred to in FIG. 1.

In step S103, a slope of the relationship curve in the current preset time interval is calculated.

Specifically, the current preset time interval refers to a complete preset time interval closest to the current time point, i.e., the previous preset time interval immediately preceding the current time point. The slope in the current preset time interval can be calculated based on the fitted data of the relationship curve in the preset time interval, or it can be calculated based on the first and last sets of state parameters in the preset time interval.

In step S104, it is determined whether the pump turbine enters the S-characteristic region according to the positivity or negativity and the absolute value of the slope.

Specifically, it is determined whether the pump turbine enters the S-characteristic region according to the positivity or negativity and the absolute value of the slope of the relationship curve in the current preset time interval. In one aspect, with reference to FIG. 1, it is known that a pump turbine easily enters the S-characteristic region during the transition process between different operating conditions. A characteristic of the S-characteristic region is that the Q-n curve has a positive slope in the curved part, i.e., the slope dQ/dn is greater than 0. Therefore, in this embodiment, one of the conditions for determining that the pump turbine enters the S-characteristic region may be that the slope dQ/dn is greater than 0. For example, if the slope of the relationship curve in the current preset time interval is a positive value, it indicates that the pump turbine has entered the S-characteristic region. In this case, the operating state of the pump turbine is unstable, and manual speed regulation is required.

Figure 1:
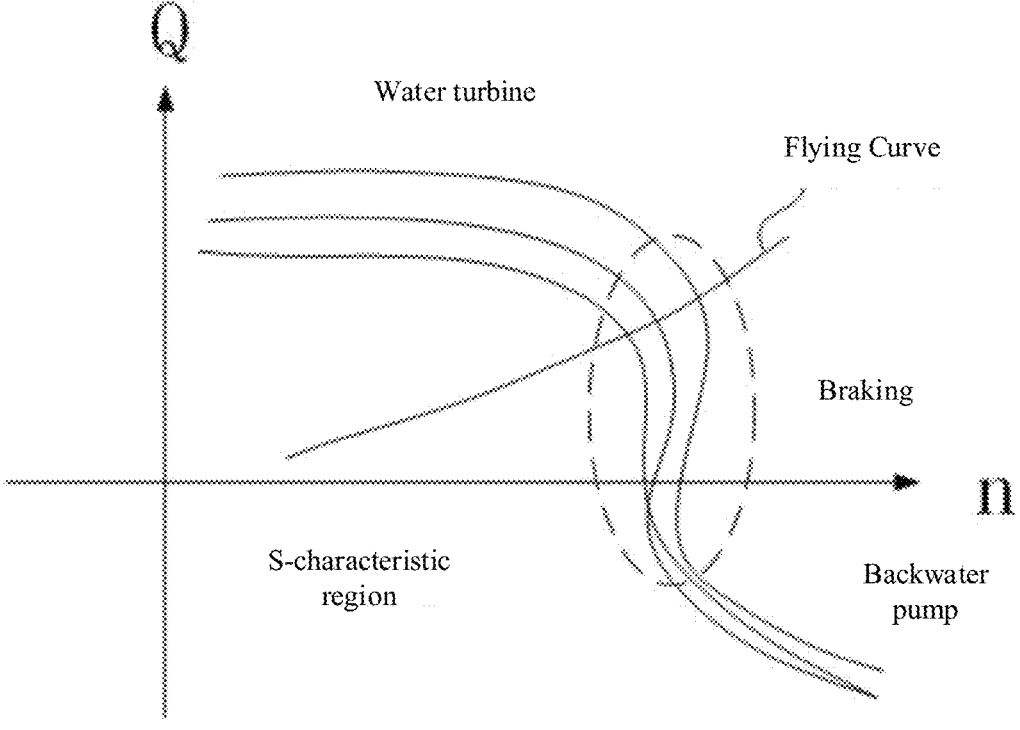
FIG. 1 is a schematic diagram of a Q-n curve of a pump turbine according to the present disclosure.

In another aspect, with continuous reference to FIG. 1, after the relationship curve enters the S-characteristic region, the absolute value |dQ/dn| of the slope of the Q-n curve rapidly increases. Therefore, it can be determined whether the relationship curve enters the S-characteristic region by comparing the magnitude of the slope of the relationship curve in the current preset time interval and the magnitude of the slope of the relationship curve in a historical preset time interval. For example, if the absolute value of the slope of the relationship curve in the current preset time interval is greater than a preset value, it indicates that the pump turbine is on the edge of the S-characteristic region or has just entered the S-characteristic region. At this time, the change rate of the relationship curve is much greater than the average level of the change rate of the relationship curve during normal operation of the pump turbine, and the pump turbine will soon enter or has entered the unstable operating state. The preset value may be determined according to a slope of a historical preset time period. For example, the preset value may be equal to twice the slope of the relationship curve at the previous preset time interval.

According to the method for identifying an S-characteristic of a pump turbine provided in this embodiment, a set of state parameters of the pump turbine are collected at a preset time interval. The state parameters include a flow rate and a rotation speed of the pump turbine. A relationship curve between the rotational speed and the flow rate of the pump turbine is determined based on the state parameters. A slope of the relationship curve within the current preset time interval is calculated. According to the positivity or negativity and the absolute value of the slope, it is determined whether the pump turbine enters the S-characteristic region, realizing the S-characteristic region identification for the pump turbine. The absolute value of the slope is introduced to determine whether the pump turbine enters the S-characteristic region, so that the moment at which the pump turbine has just entered the S-characteristic region or is about to enter the S-characteristic region can be better identified, thereby improving the identification accuracy and making the identification more timely.

FIG. 3 is a schematic flowchart of another method for identifying an S-characteristic of a pump turbine according to an embodiment of the present disclosure. Referring to FIG. 3, the method for identifying an S-characteristic of a pump turbine includes steps S201-S205.

In step S201, a set of state parameters of a pump turbine are collected at a preset time interval.

The content of S201 is completely the same as that of the foregoing step S101, and details are not repeated herein.

In step S202, a slope of a relationship curve between a rotation speed and a flow rate of the pump turbine within the current preset time interval is calculated based on the latest set of state parameters and the previous set of state parameters.

Specifically, the latest set of state parameters and the previous set of state parameters are state parameters collected at the beginning and the end of the current preset time interval respectively, and can be used to calculate the slope of the relationship curve in the current preset time interval according to a calculation formula as follows:

$$\left(\frac{dQ}{dn}\right)_i = \frac{Q_{i+1} - Q_i}{n_{i+1} - n_i}$$

where $$\left(\frac{dQ}{dn}\right)_i$$

is the slope of the relationship curve in the i-th preset time interval, $Q_{i+1}$ is the flow rate of the pump turbine in the (i+1)-th set of state parameters, $Q_i$ is the flow rate of the pump turbine in the i-th set of state parameters, $n_{i+1}$ is the rotation speed of the pump turbine in the (i+1)-th set of state parameters, $n_i$ is the rotation speed of the pump turbine in the i-th set of state parameters, and i is a natural number that is not 0.

In step S203, it is determined whether the slope meets at least one of a first condition or a second condition.

Specifically, the first condition is that the slope is positive and is represented by a formula as follows:

$$\frac{dQ}{dn} > 0.$$

If the slope of the relationship curve of the pump turbine in the current preset time period meets the first condition, it indicates that the pump turbine has entered the S-characteristic region, and the operating state of the pump turbine has become unstable. In this case, it may be directly determined that the pump turbine enters the S-characteristic region.

The formula for calculating the absolute value of the slope is as follows:

$$\left|\frac{dQ}{dn}\right|_i = \left|\frac{Q_{i+1} - Q_i}{n_{i+1} - n_i}\right|, \text{ where } \left|\frac{dQ}{dn}\right|_i$$

is the absolute value of the slope in the i-th preset time interval. The second condition is that the absolute value of the slope is greater than a first preset value, and is represented by a formula as follows:

$$\left|\frac{dQ}{dn}\right|_i > X,$$

and where X is the first preset value. If the slope of the relationship curve of the pump turbine in the current preset time period meets the second condition, it indicates that the pump turbine has just entered the S-characteristic region or is about to enter the S-characteristic region, and the pump turbine will soon become unstable. In this case, it may also be determined that the pump turbine enters the S-characteristic region.

Exemplarily, the first preset value is equal to the product of a preset coefficient and a historical slope. The historical slope may be the slope of the relationship curve in the previous preset time interval, or may be equal to the average value of the slopes of the relationship curves in several previous preset time intervals. For example, in the case that the historical slope is equal to the slope of the relationship curve in the previous preset time interval, the second condition is that the absolute value of the slope is greater than the first preset value and may also be represented by a formula as follows:

$$\left|\frac{dQ}{dn}\right|_{i+1} > a\left|\frac{dQ}{dn}\right|_i, \text{ where } \left|\frac{dQ}{dn}\right|_{i+1}$$

is the absolute value of the slope in the (i+1)-th preset time interval, and a is a preset coefficient.

In a manner of setting the preset coefficient, the preset coefficient may also be equal to the historical minimum slope ratio of the pump turbine. The slope ratio is the ratio of the slop of the relationship curve within the first preset time interval after the pump turbine enters the S-characteristic region to the slop of the relationship curve within the last preset time interval before the pump turbine enters the S-characteristic region. For example, the absolute value $|k_s|$ of the slope within the preset time interval corresponding to when the pump turbine is determined to enter the S-characteristic region and the absolute value $|k_{s-1}|$ of the slope within the previous preset time interval are obtained from historical data to calculate a slope ratio as follows:

$$[[\ ]]a_j = \frac{|k_s|}{|k_{s-1}|},$$

where the subscript j represents the j-th historical speed regulation period, and the subscript s represents the first preset time interval of the S-characteristic region. Finally, the preset coefficient is as follows: $a = \min\{a_1, a_2, \ldots, a_j, \ldots a_m\}$, and the subscripts of a represent the labels of the speed regulation periods when the pump turbine is determined to enter the S-characteristic region. The labels are set according to actual situations and may be non-continuous. m represents the total number of speed regulation periods in which the pump turbine is determined to enter the S-characteristic region in the history data.

In another manner of setting the preset coefficient, the preset coefficient may also be related to the identification accuracy requirement and is set based on a requirement of the user for the identification accuracy. In the cases where the requirement for identification accuracy is not high, it is possible to directly estimate the desired multiple values, for example, by directly setting a=2 or a=5. The smaller a is, the higher the identification accuracy is.

In step S204, it is determined that the pump turbine enters the S-characteristic region when determining that the slope meets at least one of the first condition or the second condition.

Specifically, when at least one of the first condition or the second condition is met, it indicates that the pump turbine has entered the S-characteristic region or will enter the S-characteristic region in a short time, and the short time herein may be less than or equal to 1 minute. Therefore, in this case, it can be determined that the pump turbine enters the S-characteristic region, so as to facilitate the restoration of the pump turbine to its normal working state by speed regulation as soon as possible, improving the timeliness of speed regulation and reducing the failure rate of the pump turbine.

In step S205, it is determined that the pump turbine does not enter the S-characteristic region when determining that the slope does not meet the first condition and the second condition.

Specifically, if neither the first condition nor the second condition is met, it indicates that the pump turbine does not enter the S-characteristic region or will not enter the S-characteristic region soon. Therefore, in this case, it can be determined that the pump turbine does not enter the S-characteristic region.

According to the method for identifying an S-characteristic of a pump turbine provided in this embodiment, a set of state parameters of the pump turbine are collected at a preset time interval, and a slope of a relationship curve within the current preset time interval is calculated based on the latest set of state parameters and the previous set of state parameters. It is determined whether the slope meets at least one of a first condition or a second condition. If the slope meets at least one of the first condition or the second condition, it is determined that the pump turbine enters the S-characteristic region. If the slope does not meet the first condition and the second condition, it is determined that the pump turbine does not enter the S-characteristic region. Therefore, the state identification for the pump turbine is realized. Identifying the state of the pump turbine based on the two slope conditions increases the identifiable range of the S-characteristic region and the state identification accuracy.

An embodiment of the present disclosure provides an apparatus for identifying an S-characteristic of a pump turbine. FIG. 4 is a schematic diagram of a configuration of the apparatus for identifying an S-characteristic of a pump turbine according to an embodiment of the present disclosure. Referring to FIG. 4, the apparatus 400 for identifying an S-characteristic of a pump turbine includes a state parameter collection module 401, a slope calculation module 402, and a determination module 403. The state parameter collection module 401 is configured to collect a set of state parameters of a pump turbine at a preset time interval. The state parameters include a flow rate and a rotation speed of the pump turbine. The slope calculation module 402 is configured to calculate a slope of a relationship curve between a rotation speed and a flow rate of the pump turbine within the current preset time interval. The determination module 403 is configured to determine whether the pump turbine enters the S-characteristic region according to the positivity or negativity and the absolute value of the slope.

Figure 5:
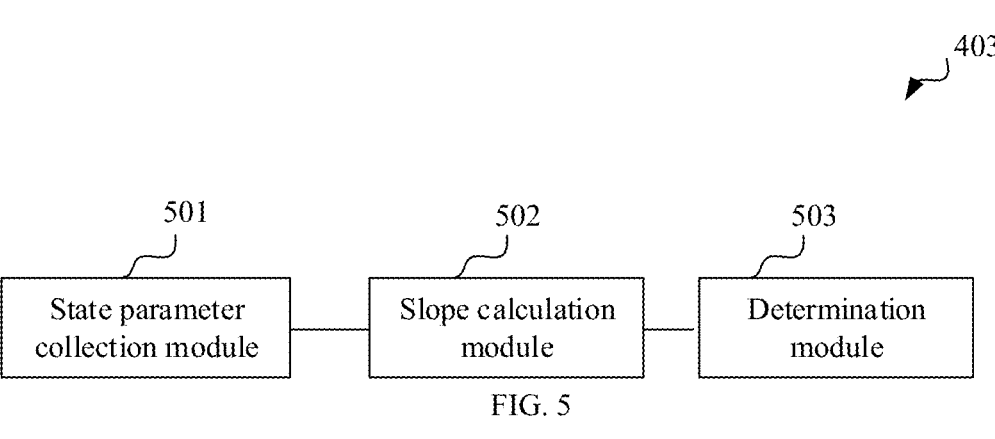
FIG. 5 is a schematic diagram of a configuration of another apparatus for identifying an S-characteristic of a pump turbine according to an embodiment of the present disclosure.

FIG. 5 is a schematic diagram of a configuration of another apparatus for identifying an S-characteristic of a pump turbine according to an embodiment of the present disclosure. With reference to FIG. 4 and FIG. 5, the determination module 403 includes a slope determination unit 501, a first S-characteristic region determination unit 502, and a second S-characteristic region determination unit 503. The slope determination unit 501 is configured to determine whether the slope meets at least one of a first condition or a second condition. The first condition is that the slope is positive, and the second condition is that the absolute value of the slope is greater than a first preset value. The first S-characteristic region determination unit 502 is configured to determine that the pump turbine enters the S-characteristic region when the slope meets at least one of the first condition or the second condition. The second S-characteristic region determination unit 503 is configured to determine that the pump turbine does not enter the S-characteristic region when the slope does not meet the first condition and the second condition.

The above apparatus for identifying an S-characteristic of a pump turbine may be implemented in whole or in part by software, hardware, and combinations thereof. Each of the above-described modules may be embedded in hardware in or independent of a processor in the computer device, or may be stored in software in a memory in the computer device so that the processor can be called to perform operations corresponding to each of the above-described modules.

Figure 6:
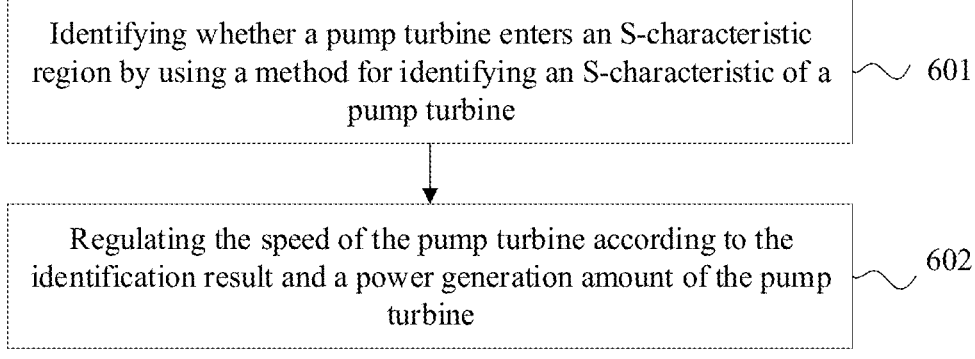
FIG. 6 is a schematic flowchart of a pump turbine control method according to an embodiment of the present disclosure.

The embodiments of the present disclosure provide a pump turbine control method. FIG. 6 is a schematic flowchart of the pump turbine control method according to an embodiment of the present disclosure. Referring to FIG. 6, the pump turbine control method includes the following steps.

In step S601, it is identified whether a pump turbine enters an S-characteristic region by using a method for identifying an S-characteristic of a pump turbine.

Specifically, the method for identifying an S-characteristic of a pump turbine used in this embodiment may be the method for identifying an S-characteristic of a pump turbine provided in any one of the embodiments of the present disclosure and solutions that can be obtained with various obvious changes, readjustments, combinations, or replacements for those skilled in the art on the basis thereof.

In step S602, the speed of the pump turbine is regulated according to the identification result and a power generation amount of the pump turbine.

Specifically, in addition to the flow rate and rotation speed of the pump turbine, the state parameters may further include the power generation amount of the pump turbine. With reference to the identification result and the power generation amount, the speed of the pump turbine can be regulated to achieve the target power generation of the pump turbine. For example, the speed regulation of the pump turbine can be achieved by changing the angle of the guide vanes of the pump turbine.

In the pump turbine control method provided in this embodiment, the method for identifying the S-characteristic of the pump turbine is used to identify whether the pump turbine enters the S-characteristic region, and then the speed of the pump turbine is regulated according to the identification result and the power generation amount of the pump turbine, realizing accurate control of the pump turbine. The pump turbine is controlled by identifying whether it enters the S-characteristic region combined with the power generation amount of the pump turbine, improving the stability and safety of the pump turbine.

Figure 7:
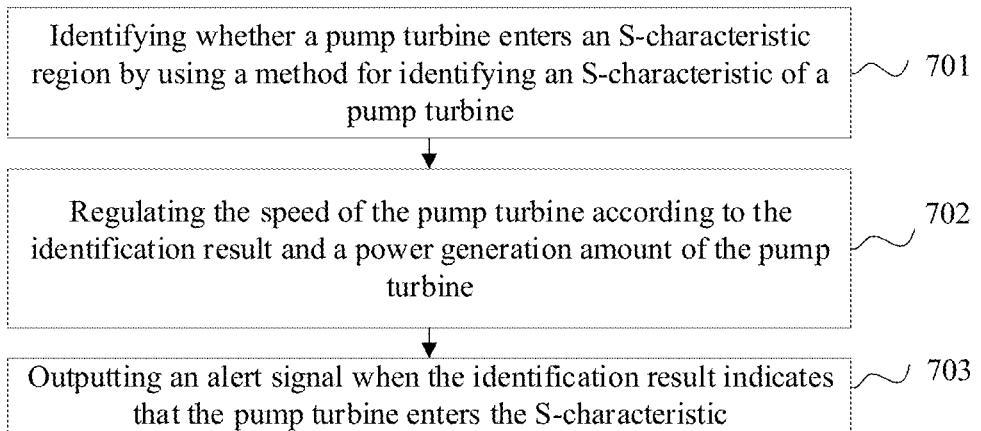
FIG. 7 is a schematic flowchart of another pump turbine control method according to an embodiment of the present disclosure.

FIG. 7 is a schematic flowchart of another pump turbine control method according to an embodiment of the present disclosure. Referring to FIG. 7, the pump turbine control method includes the following steps.

In step S701, it is identified whether a pump turbine enters an S-characteristic region by using a method for identifying an S-characteristic of a pump turbine.

In step S702, the speed of the pump turbine is regulated according to the identification result and a power generation amount of the pump turbine.

In step S703, an alert signal is output when the identification result indicates that the pump turbine enters the S-characteristic.

Specifically, the sequence between step S702 and step S703 is not limited. In other embodiments, the alert signal may be first output according to the identification result, and then the speed of the pump turbine is regulated according to the identification result and the power generation amount of the pump turbine.

Figure 8:
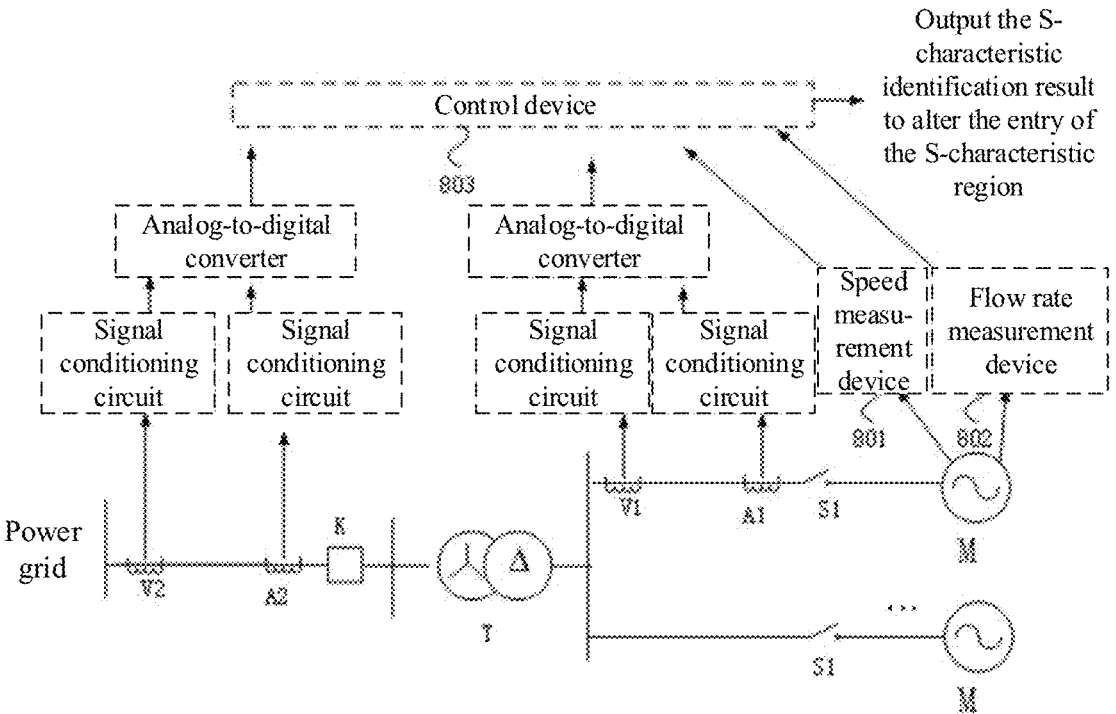
FIG. 8 is a schematic structural diagram of a pump turbine control system according to an embodiment of the present invention.

Exemplarily, FIG. 8 is a schematic structural diagram of a pump turbine control system according to an embodiment of the present disclosure. Referring to FIG. 8, a pumped storage power station may include a plurality of pump turbines M, rotation speed measurement devices 801, flow rate measurement devices 802, control switches S1, first voltage transformers V1, and first current transformers A1 that are in a one-to-one correspondence with the pump turbines (in this embodiment, the pump turbines M each correspond to one rotation speed measurement device 801, one flow rate measurement device 802, one control switch S1, one first voltage transformer V1, and one first current transformer A1, but only measurements and control devices corresponding to one pump turbine are shown in the figure), a transformer T, a grid connection switch K, a second current transformer A2, and a second voltage transformer V2. A first side of the grid connection switch K is connected to a power grid through the second current transformer A2 and the second voltage transformer V2 in sequence. A second side of the grid connection switch K is connected to each pump turbine M through the transformer T, the corresponding first voltage transformer V1, the corresponding first current transformer A1, and the corresponding control switch S1. The first current transformer A1 and the first voltage transformer V1 collect the current and the voltage of the pump turbine M side, respectively. The second current transformer A2 and the second voltage transformer V2 collect the current and the voltage of a bus on the power grid side, respectively. previous set current signals and analog voltage signals collected by each current transformer and each voltage transformer are respectively input into corresponding signal conditioning circuits for signal conditioning and removal of the high-frequency noise, then corresponding analog-to-digital converters convert the analog current signals and analog voltage signals into digital signals and transmit the digital quantity signals to a control device 803. The control device 803 can implement any one of the foregoing identification methods or control methods. Specifically, the control device 803 can calculate the power generation amount of each pump turbine M by using the digital current and voltage signals. The rotation speed measurement device 801 and the flow rate measurement device 802 collect the flow rate in the impeller of the corresponding pump turbine M and the rotation rate of the pump turbine, respectively, and transmit the flow rate and the rotation speed of the pump turbine to the control device. The apparatus for identifying the S-characteristic configured in the control device 803 can identify whether the corresponding pump turbines M enter the S-characteristic region according to the flow rates and rotation speeds, output an S-characteristic identifying result, and output an alert signal when any pump turbine M enters the S-characteristic region, so as to prompt other pump turbines M to pay attention to the effect caused by the speed regulation of the pump turbine which enters the S-characteristic region during the speed regulation, and remind the grid connection switch of the upcoming operation.

According to the method and apparatus for identifying an S-characteristic of a pump turbine and the control method provided in the embodiments of the present disclosure, a set of state parameters of the pump turbine are collected at a preset time interval, and the state parameters include a flow rate and a rotation speed of the pump turbine. A relationship curve between the rotation speed and the flow rate of the pump turbine is calculated based on the status parameters. A slope of the relationship curve in the current preset time interval is calculated. According to the positive and negative polarity and the absolute value of the slope, it is determined whether the pump turbine enters the S-characteristic region, realizing the identification of the S-characteristic of the pump turbine. The introduction of determining whether the pump turbine enters the S-characteristic region according to the absolute value of the slope can better identify the moment when the pump turbine enters the S-characteristic region or is about to enter the S-characteristic region, thereby improving the identification accuracy and making the identification more timely.

The foregoing product can perform the method provided in any embodiment of the present disclosure, and has corresponding function modules for performing the method and beneficial effects.

It should be noted that the foregoing is only a preferred embodiment of the present disclosure and a technical principle utilized therein. A person skilled in the art will understand that the present invention is not limited to the specific embodiments described herein. Various obvious changes, readjustment, combination, and replacement can be made by those skilled in the art without departing from the protection scope of the present invention. Therefore, although the present invention is described in detail by using the foregoing embodiments, the present invention is not limited to the foregoing embodiments, but may include more other equivalent embodiments without departing from the concept of the present invention. The scope of the present invention is determined by the accompanying claims.

What is claimed is:

1. A pump turbine control method, applied to a pumped storage power station, the pumped storage power station comprising at least one pump turbine, at least one rotation speed measurement device and at least one flow rate measurement device that are in a one-to-one correspondence with the pump turbine, and a control device, the method comprising:

identifying, by the control device, whether the pump turbine enters an S-characteristic region using a method for identifying an S-characteristic of a pump turbine to obtain an identification result; and regulating, by the control device, a speed of the pump turbine according to the identification result and a power generation amount of the pump turbine;

wherein the method for identifying the S-characteristic of the pump turbine includes:

collecting a set of state parameters of the pump turbine at a preset time interval through the rotation speed measurement device and the flow rate measurement device, wherein the state parameters comprise a flow rate obtained by the flow rate measurement device and a rotation speed of the pump turbine obtained by the rotation speed measurement device;

calculating, by the control device, a slope of a relationship curve between the rotation speed and the flow rate of the pump turbine within a current preset time interval; and determining, by the control device, whether the pump turbine enters the S-characteristic region according to a positivity or negativity and an absolute value of the slope, including:

determining whether the slope meets at least one of a first condition or a second condition, wherein the first condition is that the slope is positive, the second condition is that the absolute value of the slope is greater than a first preset value, the first preset value being equal to a product of a preset coefficient and a historical slope, the historical slope being a slope of the relationship curve within a previous preset time interval;

determining that the pump turbine enters the S-characteristic region when the slope meets at least one of the first condition or the second condition; and determining that the pump turbine does not enter the S-characteristic region when the slope does not meet the first condition and the second condition.

2. The pump turbine control method according to claim 1, further comprising:

after identifying whether the pump turbine enters the S-characteristic region, outputting an alert signal when the identification result indicates that the pump turbine enters the S-characteristic region.

3. The pump turbine control method according to claim 1, wherein calculating the slope of the relationship curve between the rotation speed and the flow rate of the pump turbine within the current preset time interval includes:

calculating the slope of the relationship curve within the current preset time interval according to a latest set of state parameters and a previous set of state parameters.

4. The pump turbine control method according to claim 1, wherein the preset coefficient is equal to a historical minimum slope ratio of the pump turbine, and the slope ratio is equal to a ratio of a slope of the relationship curve within a first preset time interval after the pump turbine enters the S-characteristic region to a slope of the relationship curve within a last preset time interval before the pump turbine enters the S-characteristic region.

5. The pump turbine control method according to claim 1, wherein the preset coefficient is determined based on an identification accuracy requirement.

6. The pump turbine control method according to claim 1, wherein the relationship curve between the rotation speed and the flow rate of the pump turbine is obtained by fitting multiple sets of state parameters.

7. The pump turbine control method according to claim 6, wherein calculating the slope of the relationship curve between the rotation speed and the flow rate of the pump turbine within the current preset time interval includes:

calculating the slope of the relationship curve within the current preset time interval according to fitted data of the relationship curve in the preset time interval.

*  *  *  *  *